April 5, 1932. H. J. ROUTSON 1,852,678
WRENCH
Filed May 29, 1931
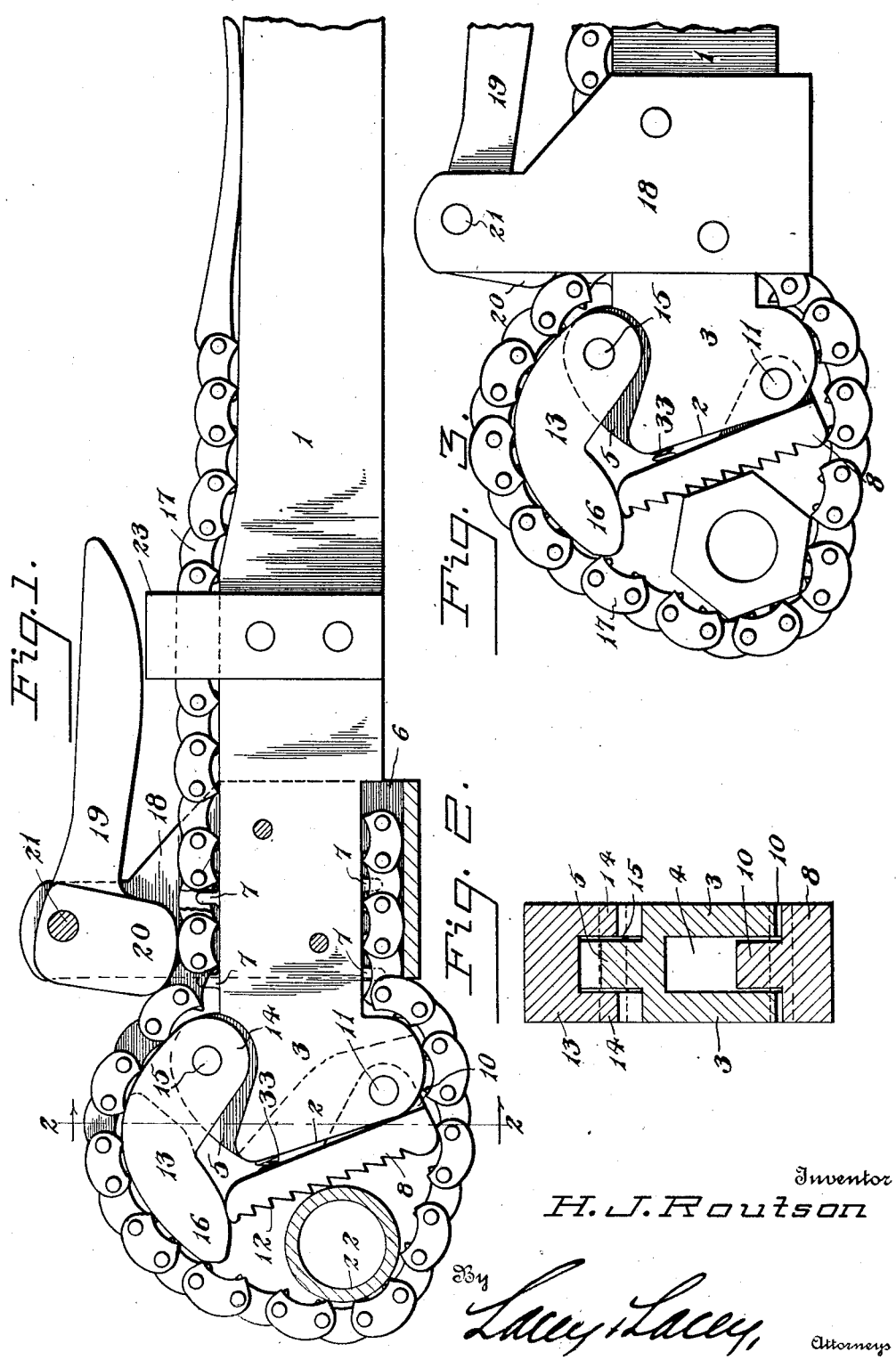

Patented Apr. 5, 1932

1,852,678

UNITED STATES PATENT OFFICE

HOWARD J. ROUTSON, OF FAIRFIELD, IOWA

WRENCH

Application filed May 29, 1931. Serial No. 541,064.

The object of the present invention is to provide a wrench which may be very easily and quickly adjusted to any object which is to be turned and will conform to the contour of the object and firmly grasp the same so that it may be easily turned as desired. The invention is illustrated in the accompanying drawings and consists in certain novel features which will be hereinafter first fully described and then more particularly defined in the appended claims.

In the drawings,

Figure 1 is a side elevation, partly in section, of a wrench embodying my improvements, Fig. 2 is a transverse section on the line 2—2 of Fig. 1, and Fig. 3 is a side elevation illustrating a different application of the wrench.

In carrying out the invention, there is provided a handle bar or lever 1 which may be of any desired dimensions and is essentially a long bar which may be easily grasped by the user. One end of the bar is shaped to provide an inclined surface 2 across its extremity and is forked to provide the side plates 3 with the open space or chamber 4 between them, and on its upper edge (in the position shown in the drawings) is formed with a central lug or rib 5. At the rear of the inclined face 3 and recess 4, one edge of the bar is cut away, as shown at 6, and, in said cut away portion, lugs or teeth 7 are formed on the edge of the bar. Similar lugs or teeth are formed on the opposite edge of the bar, and the purpose of these teeth or lugs will presently appear. A jaw 8 is provided, and this jaw has a lug 10 disposed centrally on its rear surface at one end to project within the chamber 4 and be pivotally held therein by a pivot pin 11 inserted through the side plates 3 and the rib 10, as will be understood. The outer working face of this jaw 8 may be serrated, as shown at 12, or it may be smooth, according to the work to be engaged. The free end of the jaw extends somewhat beyond the inclined face 2 of the head of the wrench, and an expansion spring 33 is seated between the jaw and the head so as to tend constantly to throw the jaw forward in working position. A dog 13 is provided and has side lugs or ears 41 at one end to pass at opposite sides of the rib 5 on the head and be pivoted thereto by a pivot pin 15, as will be understood. This dog has its upper forward portion 16 disposed to ride on the upper end of the jaw 12 and hold the jaw to its work, and it is tapered so that at times it may ride to a position at the rear of the jaw and bear against the rear side of the same. In the drawings, the dog bears upon the upper extremity of the jaw, but if very small work is being engaged the end of the dog may ride to a position at the rear of the jaw and bear against the back of the same to hold it to its work. There is also provided a gripping chain 17 which has one end disposed within the cut away or recessed portion 6 of the handle bar with its links engaged over the teeth or lugs 7 therein, as shown in Fig. 1, and a housing 18 is fitted around the handle bar and riveted thereto so as to retain the end of the chain anchored to the bar by its engagement with said teeth. At the opposite side of the handle bar the housing 18 is extended somewhat and is open to receive a locking lever 19 having an eccentric head 20 and pivoted, as at 21, between the sides of the housing. The chain is passed around the work which, in Fig. 1, is a pipe 22, and is then carried upwardly over the dog and then rearwardly along the upper edge of the handle bar through the housing and through a guide 23 secured upon the handle bar at the rear of the housing. The links of the chain, at the open side of the housing, are engaged over the lugs or teeth 7 therein after it has been drawn tightly around the work, and the locking lever is then swung down to the position shown in Fig. 1 so that the eccentric head 20 will bear upon the chain and hold it firmly in engagement with the teeth or lugs 7. The lever or handle bar 1 is then swung to one side so as to effect a turning of the work, as will be understood. When the lever is turned in one direction, the spring 33 presses the jaw 8 against the work so that the work will be firmly gripped by and between the jaw and the chain, but when the lever is turned in the opposite direction, the jaw may yield so that it will not impart turning movement to the work but will ride over the work to assume a position in which it will obtain a fresh grip on the work. After the work has been turned home, the locking lever 19 is swung upwardly, whereupon the chain may be released and the wrench withdrawn from the work.

While the wrench is particularly efficient as applied to a pipe or tube or other object of circular cross section, it may be applied to objects of any outline, and in Fig. 3 is shown applied to a hexagonal nut, the chain readily conforming to the contour of the object so that a very strong grip upon the same will be attained.

The device is very simple in the construction and arrangement of its parts, which are compact and not apt to get out of order. It is easily manipulated and is efficient in operation.

Having thus described the invention, I claim:

1. A wrench comprising a handle bar, a jaw pivoted to an end of the bar, a dog pivoted to the same end of the bar at the opposite side of the same and adapted to bear against the jaw to hold it to work, yieldable means between the bar and the jaw tending to hold the jaw away from the bar, a flexible gripping member anchored at one end to the bar and passing around the end of the same beyond the jaw and the dog with its free end portion lying against the opposite edge of the bar, and means for locking the free end portion of the same to the bar.

2. A wrench comprising a handle bar, a jaw pivoted to the end of the bar, a dog pivoted to the end of the bar at a point remote from the jaw and having a projecting end portion adapted to bear against the jaw to hold the same to work, a chain anchored at one end of the bar and extending therefrom beyond the jaw and the dog with its free end portion lying along an edge of the bar, a housing secured upon the bar and extending around the chain, and a locking lever pivoted within the housing and provided with an eccentric head bearing upon the chain whereby to lock the free end portion thereof to the bar.

3. A wrench comprising a handle bar having one end formed into a head having an inclined face, a jaw pivoted at one end within the head and having its opposite end extending beyond the face of the head, a dog pivoted upon the head and having an end portion projecting therefrom beyond the end of the jaw, an expansion spring disposed between the jaw and the head, and means carried by the handle bar and cooperating with the jaw whereby to grip work.

In testimony whereof I affix my signature.

HOWARD J. ROUTSON. [L. S.]